(12) United States Patent
Morris

(10) Patent No.: US 7,950,531 B2
(45) Date of Patent: May 31, 2011

(54) MOUNTING ARRANGEMENT FOR A STANDARD TELECOMMUNICATIONS PANEL

(75) Inventor: Stephen James Morris, Cheltenham (GB)

(73) Assignee: ADC GmbH, Berlin (DE)

( * ) Notice: Subject to any disclaimer, the term of this patent is extended or adjusted under 35 U.S.C. 154(b) by 829 days.

(21) Appl. No.: 11/821,569

(22) Filed: Jun. 22, 2007

(65) Prior Publication Data

US 2008/0107497 A1 May 8, 2008

Related U.S. Application Data

(60) Provisional application No. 60/816,006, filed on Jun. 23, 2006.

(51) Int. Cl.
*A47F 5/00* (2006.01)
*F16B 13/04* (2006.01)

(52) U.S. Cl. .................. 211/26; 411/21; 411/84

(58) Field of Classification Search .............. 411/84–85, 411/102, 182, 21, 22; 211/26, 103, 190, 211/187

See application file for complete search history.

(56) References Cited

U.S. PATENT DOCUMENTS

| | | | | |
|---|---|---|---|---|
| 3,363,381 A * | 1/1968 | Forrest | ........................... | 52/464 |
| 4,240,323 A * | 12/1980 | Kojima | ........................... | 411/15 |
| 4,284,378 A * | 8/1981 | Mizusawa | ........................... | 411/21 |
| 4,579,792 A * | 4/1986 | Bruder | ........................... | 429/162 |
| 5,026,235 A | 6/1991 | Muller et al. | | |
| 5,046,904 A * | 9/1991 | Malinow | ........................... | 411/15 |
| 5,429,467 A * | 7/1995 | Gugle et al. | .................. | 411/182 |
| 5,738,476 A * | 4/1998 | Assimakopoulos | .......... | 411/508 |
| 5,951,223 A | 9/1999 | Lindquist | | |
| 6,227,756 B1 * | 5/2001 | Dube et al. | .................. | 403/353 |
| 6,279,754 B1 * | 8/2001 | Hoss et al. | ...................... | 211/26 |
| 6,726,034 B2 * | 4/2004 | Holbrook et al. | .......... | 211/87.01 |
| 6,758,353 B2 * | 7/2004 | Orr | ............................... | 211/183 |
| 7,008,159 B2 * | 3/2006 | Dendo | ........................... | 411/182 |
| 7,113,407 B2 | 9/2006 | Holt et al. | | |
| 7,165,690 B2 * | 1/2007 | Wu | ............................... | 211/192 |
| 7,832,570 B1 * | 11/2010 | Reynolds | ...................... | 211/103 |
| 2005/0191901 A1 | 9/2005 | Follingstad | | |
| 2005/0239344 A1 | 10/2005 | Olsen et al. | | |

FOREIGN PATENT DOCUMENTS

WO WO 02/089499 A2 11/2002

* cited by examiner

*Primary Examiner* — Flemming Saether
(74) *Attorney, Agent, or Firm* — Merchant & Gould P.C.

(57) ABSTRACT

A mounting arrangement for mounting a telecommunications panel to a frame. The mounting arrangement including a fastener piece having a retaining clip and a corresponding threaded hole. The retaining clip expanding outward when a fastener is threaded into the corresponding threaded hole. The expanded retaining clip engaging openings formed in the frame to retain the telecommunications panel in a position relative to the frame.

12 Claims, 2 Drawing Sheets

MOUNTING ARRANGEMENT FOR A STANDARD TELECOMMUNICATIONS PANEL

CROSS REFERENCE TO RELATED APPLICATIONS

This application claims the benefit of U.S. Provisional Application No. 60/816,006, filed Jun. 23, 2006; which application is incorporated herein by reference.

TECHNICAL FIELD

The present disclosure relates generally to devices for use in the telecommunications industry, and various methods associated with such devices. More particularly, this disclosure relates to mounting arrangements for telecommunication panels.

BACKGROUND

Telecommunication panels are used to provide electrical connections in a wide variety of telecommunication applications. The panels are often housed within and mounted to racks and cabinets, for example. Many racks and cabinets include frames having defined positions at which panels may be mounted. The panels are mounted at the defined panel positions with fasteners.

On many frame systems, panels are mounted to the frame by engaging screws with captive cage nuts provided within the frame. Cage nuts are designed to give a certain amount of float to ensure that manufacturing tolerances experienced with sheet metal frame constructions are accommodated. The cage nuts are typically provided within square holes located in the frame. Providing such a fastening system is time consuming and can lead to misalignment problems when attempting to match holes across the width of the frame.

In general, improvement has been sought with respect to such systems and methods. Accommodations to utilize some existing devices of such systems is also needed.

SUMMARY

The present disclosure relates to a mounting arrangement for use with a telecommunications panel and a frame. The mounting arrangement is configured to secure a standard panel to a non-standard frame. A standard panel is a panel that has mounting brackets with mounting holes sizes for receipt of fasteners; which fasteners in conventional applications typically engage cage nuts provided on the frame. A non-standard frame is a frame that does not have cage nuts to which standard panels typically mount.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
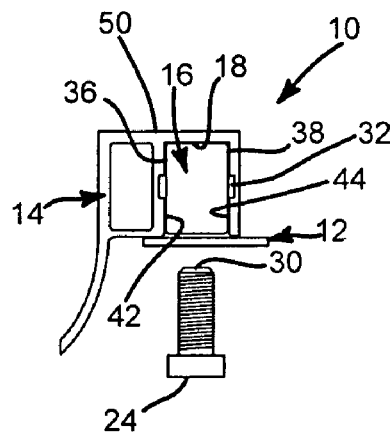
FIG. 1 is a top plan view of one embodiment of a mounting arrangement that can be used to mount a telecommunications panel to a frame, according to the principles of the present disclosure.
Figure 2:
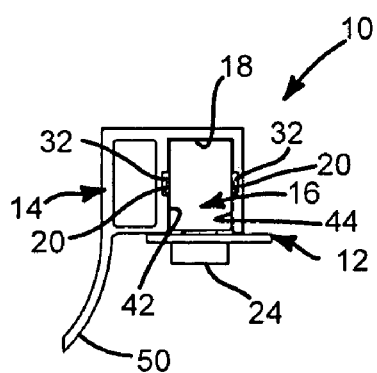
FIG. 2 is a top plan view of the mounting arrangement of FIG. 1, showing a telecommunications panel secured to a frame, according to the principles of the present disclosure.
Figure 5:
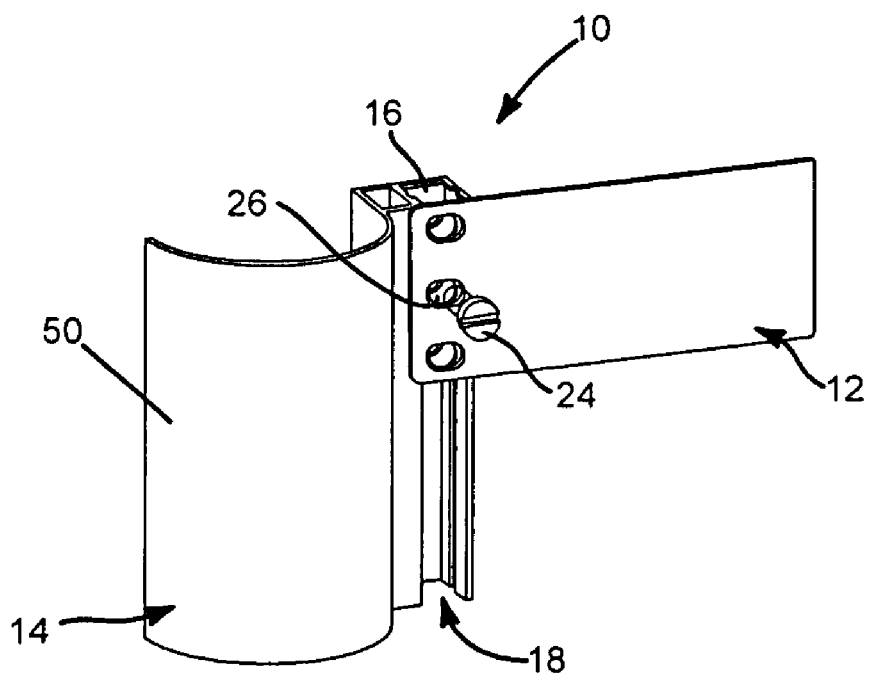
FIG. 5 is a perspective view of mounting arrangement of FIG. 1.

FIGS. 1-2 and 5 illustrate a mounting arrangement 10 that provides an interconnection between a telecommunications panel 12 (partially represented) and a telecommunications frame 14 (also partially represented). The panel 12 in the illustrated embodiment is a patch panel, however, other types of panels and equipment can be provided with the present mounting arrangement 10 in accordance with the principles disclosed. The frame 14 is a telecommunications rack frame. The mounting arrangement 10 can also be utilized in other systems and structures, such as cabinets and wall boxes, for example.

The present mounting arrangement 10 accommodates securing of a standard panel (e.g., 12) relative to a non-standard frame (e.g., 14). The non-standard frame 14 includes side frame members 50 (only one shown as the other side frame member is identically constructed). Referring to FIG. 5, the side frame member 50 includes a vertical channel 18. As shown in FIG. 1, the vertical channel 18 defines a plurality of opposing openings 32 (e.g., holes or slots) located on opposite sides 42, 44 of the channel 18. The plurality of openings 32 extends along the length of the vertical channel 18, generally from a top of the frame to the bottom of the frame.

The present mounting arrangement 10 generally includes a fastener piece 16 sized and configured to fit within the channel 18 of the frame 14. In use, the fastener piece 16 is laterally pushed within the channel 18 of the frame 14. The fastener piece 16 is constructed and sized so that the fastener piece 16 can be laterally inserted within the channel 18 from the front of the frame at a desired position; as opposed to accessing the top of the frame and then sliding the piece down the channel to the desired position.

Figure 3:
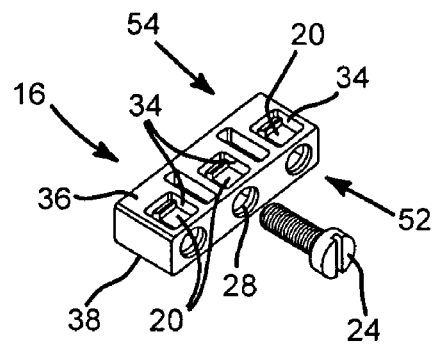
FIG. 3 is a perspective view of the mounting arrangement of FIG. 1, shown in isolation.
Figure 4:
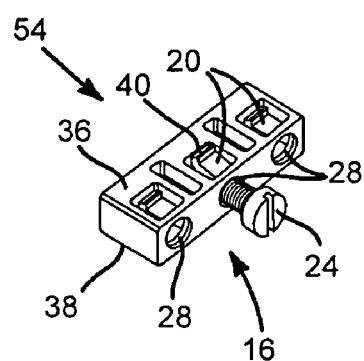
FIG. 4 is a perspective view of the mounting arrangement of FIG. 2, shown in isolation.

Referring to FIGS. 3 and 4, the fastener piece 16 generally has a front 52, a rear 54, a first side 36 and a second opposite side 38. The fastener piece 16 defines at least one aperture 34 that extends through the fastener piece 16 from the first side 36 to the second opposite side 38. In the illustrated embodiment, the fastener piece 16 has three apertures 34.

The mounting arrangement 10 further includes retaining clips 20 disposed within the apertures 34. The retaining clips 20 are each designed to expand from a first normal state to a second expanded stated. In the normal state, as shown in FIG. 1, the retaining clips 20 do not extend beyond the sides 36, 38 of the fastener piece 16 so as to not obstruct lateral insertion of the fastener piece 16 within the channel 18 of the frame 14. As will be described in greater detail hereinafter, in the expanded state, the retaining clip 20 extends through the aperture 34 of the fastener piece 16 to engage the opposing openings 32 of the side frame member 50, as shown in FIG. 2.

Referring still to FIGS. 3 and 4, a fastener hole 28 is formed in the front 52 of the fastener piece 16. In the illustrated embodiment, three fastener holes 28 (e.g., three threaded holes) are provided, each hole 28 being located in correspondence to an aperture 34 and a retaining clip 20. In an alternative embodiment, as shown in FIG. 6, a fastener piece 46 may include only one fastener hole 48 (e.g., a single threaded hole) and only one corresponding retaining clip 20.

Figure 6:
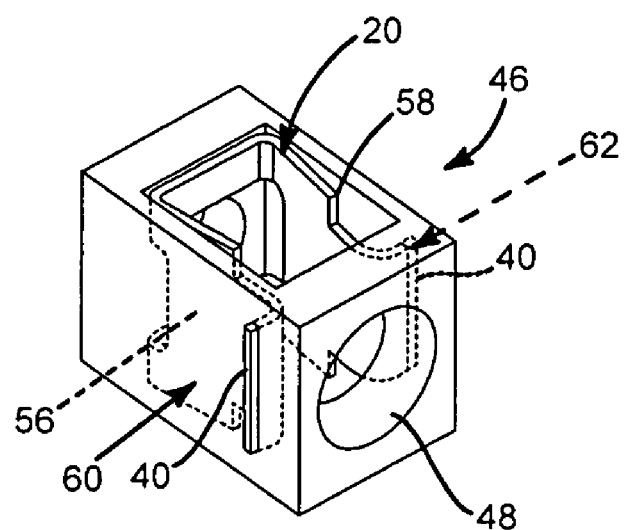
FIG. 6 is a perspective view of another embodiment of a mounting arrangement that can be used to mount a telecommunications panel to a frame, according to the principles of the present disclosure.

Referring now to FIG. 6, one embodiment of the retaining clip 20 is illustrated. The retaining clip 20 of this fastener piece 46 is identical to those used in the fastener piece 16 of FIGS. 1-5. The retaining clip 20 is a U-shaped clip having first and second arms 56, 58 that define first and second clip ends 60, 62. The retaining clip 20 further includes transverse tabs 40 that extend outward from the first and second arms 56, 58 (e.g., at the first and second clip ends 60, 62).

Referring again to FIG. 5, when affixing a panel 12 to the frame 14, the fastener piece 16 is positioned within the channel 18 and the panel 12 aligned to the fastener piece 16. In particular, a mounting through hole 26 of the panel 12 is aligned with one of the fastener holes 28 of the piece 16. A fastener 24 is then inserted through the through hole 26 formed in the panel 12 and threaded into the fastener hole 28 of the fastener piece 16.

Referring back to FIG. 2, as the fastener 24 threads into the fastener hole 28 of the piece 16, the retaining clip 20 expands from the first normal state to the second expanded state to secure the panel 12 in a position relative to the frame 14. That is, the turning action and threading engagement of the fastener 24 causes the first and second clip ends 60, 62 of the retaining clip 20 to deflected and expanded outward through the aperture 34 to engage the openings 32 formed within the channel 18 of the frame 14. In particular, an end 30 (FIG. 1) of the fastener 24 contacts the arms 56, 58 and pushes the transverse tabs 40 radially outward from the sides 36, 38 of the fastener piece 16 to engage the frame openings 32.

The engagement between the deflected retaining clip 20 and the openings 32 of the frame 14 vertically support and secured the panel 12 relative to the frame 14. Vertical alignment of the fastener piece 16 is achieved via the pre-set openings 32 formed in the frame 14. As can be understood, removal of the panel 12 is performed by simply reversing the above assembly process.

In one embodiment, the fasteners 24 of the mounting arrangement 10 are threaded, quarter-turn fasteners that require only ¼ turn to contact and outwardly expand the retaining clip 20 of the fastener piece 30. The quarter-turn fasteners provide for quick and easy assembly of the panel 12 to the frame 14.

The above specification provides a complete description of the present invention. Since many embodiments of the invention can be made without departing from the spirit and scope of the invention, certain aspects of the invention reside in the claims hereinafter appended.

What is claimed is:

1. A mounting system for securing a telecommunications panel to a telecommunications frame, the system comprising:
   a) a telecommunication frame including a side frame member, the side frame member including a vertical channel, the vertical channel defining opposing openings located along opposite sides of the vertical channel;
   b) a telecommunications panel having a through hole for receipt of a mounting fastener; and
   c) a mounting arrangement that provides an interconnection between the telecommunications panel and the telecommunications frame, the mounting arrangement including:
      i) a fastener piece having a front, a rear, a first side and a second opposite side, the fastener piece defining an aperture that extends through the piece from the first side to the second opposite side; and
      ii) a retaining clip disposed within the aperture of the fastener piece, the retaining clip being configured to expand from a first normal state to a second expanded state;
      iii) wherein when the retaining clip is in the first normal state, the mounting arrangement is sized for lateral insertion into the channel of the frame; and
      iv) wherein when the retaining clip is in the second expanded state, the retaining clip extends through the aperture of the fastener piece to engage the opposing openings of the side frame member, the mounting arrangement thereby securing the telecommunications panel in a position relative to the telecommunications frame.

2. The system of claim 1, wherein the retaining clip includes first and second clip ends, the first and second clip ends extending outward beyond the sides of the fastener piece only when the retaining clip is expanded to the second expanded state.

3. The system of claim 2, wherein the retaining clip is a U-shaped clip.

4. The system of claim 3, wherein the retaining clip includes first and second arms that define the first and second clip ends, and transverse tabs that extend outward from the arms.

5. The system of claim 1, wherein the fastener piece further defines a fastener hole formed in the front of the fastener piece, the location of the fastener hole corresponding to the location of the aperture.

6. The system of claim 5, further including a fastener that secures the telecommunications panel to the fastener piece of the mounting arrangement, the fastener being sized for receive in the through hole of the telecommunications panel.

7. The system of claim 6, wherein the fastener is a threaded fastener that threads into the fastener hole to expand the retaining clip from the first normal state to the second expanded state.

8. The system of claim 7, wherein the fastener is a quarter-turn fastener that requires only a ¼ turn to expand the retaining clip from the first normal state to the second expanded state.

9. The system of claim 6, wherein the fastener contacts the retaining clip when positioned in the fastener hole of the fastener piece to expand the retaining clip from the first normal state to the second expanded state.

10. The system of claim 1, wherein the fastener piece of the mounting arrangement includes a plurality of apertures and a plurality of retaining clips, each retaining clip being positioned within one of the apertures.

11. The system of claim 1, wherein the fastener piece further defines a fastener hole that receives a fastener in a direction from the front of the fastener piece toward the rear.

12. The system of claim 1, wherein the aperture formed in the fastener piece remains the same size while the retaining clip expands from the first normal state to the second expanded state.

* * * * *